Jan. 14, 1947.   P. D. WURZBURGER   2,414,184
PIPE COUPLING
Filed Sept. 27, 1944
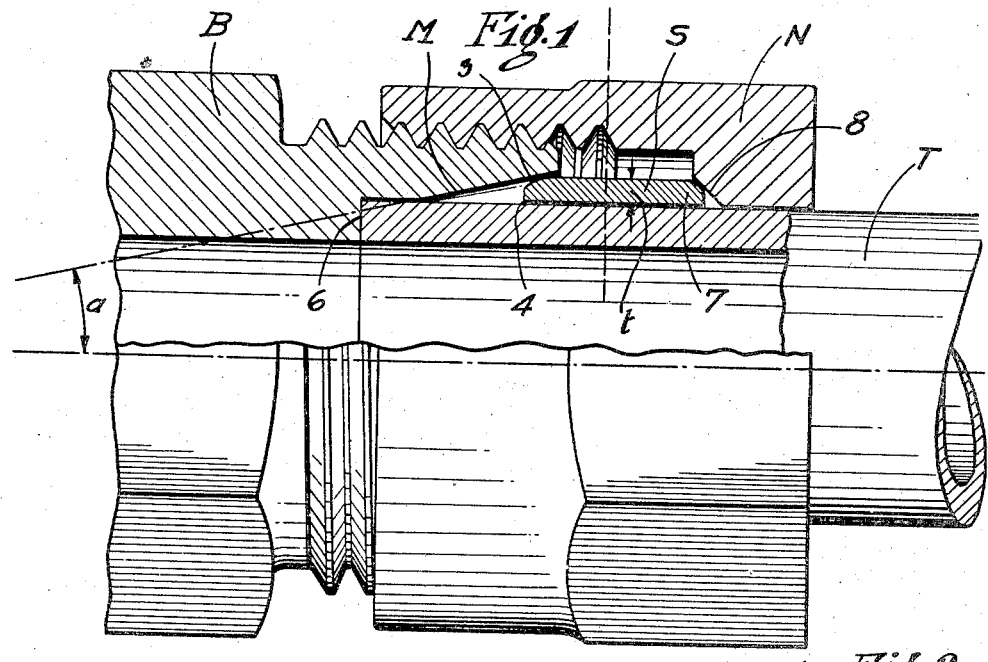
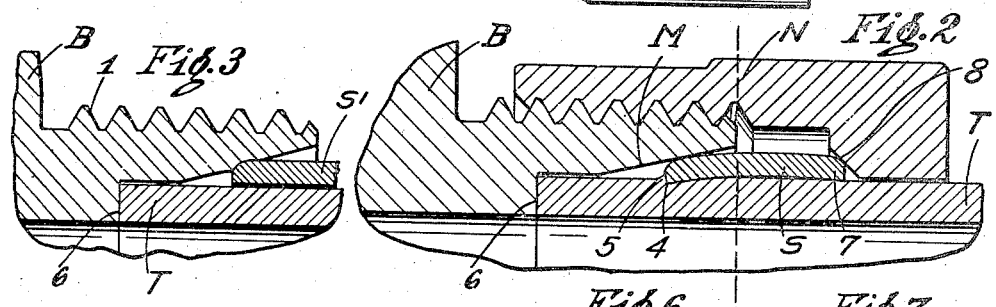
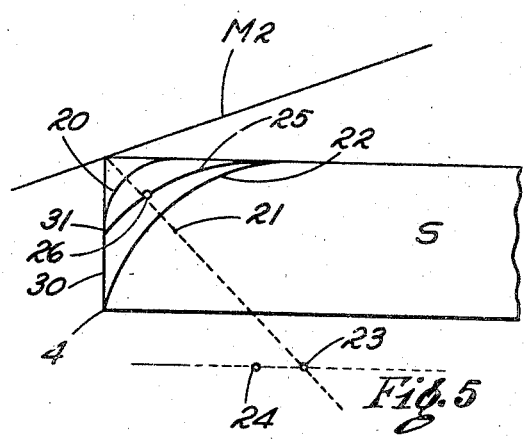
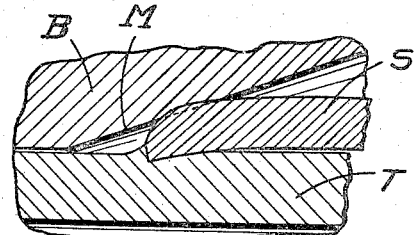
INVENTOR.
PAUL D. WURZBURGER
BY John C. Kerr
ATTORNEY Patented Jan. 14, 1947

2,414,184

UNITED STATES PATENT OFFICE 2,414,184

PIPE COUPLING

Paul D. Wurzburger, Cleveland, Ohio

Application September 27, 1944, Serial No. 556,004

1 Claim. (Cl. 285—122)

This invention relates to tube or pipe couplings and more particularly to that type of tube or pipe coupling employing a sleeve or packing member provided with a forward internal sharp edge of a material harder than the pipe to be connected and which is adapted to be constricted when forced against a camming shoulder or flared mouth of a body member of the coupling in such a way that the internal sharp edge cuts or bites into the outer surface of the tube or pipe to be coupled to form its own seat, providing a satisfactory hydraulic and mechanical joint.

Couplings of this general nature are disclosed in the United States Patents Nos. 2,139,413 granted December 6, 1938, 2,171,217 granted August 29, 1939, 2,201,404 granted May 21, 1940, 2,211,856 granted August 20, 1940, and 2,230,116 granted January 28, 1941.

It has been found in the use of these couplings that certain difficulties have been experienced, for example, when it is desired to couple a tube or pipe of relatively hard material such as steel or other ferrous material to a body member which may be softer than the steel of the pipe. It is necessary, of course, that the packing ring, which is intended to bite or cut into the material of the pipe be of some material which is either inherently harder than that of the pipe or can be made so by suitable treatment. When this material is used in conjunction with a camming surface of a flaring mouth in a softer body member, there is a danger that instead of the body member camming the packing ring into biting or cutting engagement with the tube, the packing ring will bite into the camming surface itself, which is undesired, thus either preventing the making of a satisfactory coupling or so distorting the camming surface that the coupling may not be uncoupled and again recoupled in a satisfactory way. To avoid this all the above mentioned patents with the exception of the last one, resort to the expedient of providing a packing ring having an undercut portion, so that the cutting edge was disposed at a substantial distance inward from the end of the packing ring and the portion of the packing ring arranged to engage the camming surface was thin in respect to that portion opposite the cutting edge. This was an effective solution to the problem and is entirely satisfactory in use. However, the mechanical operation of forming packing rings in this way is quite difficult, as it requires very accurate machining on parts which are sometimes quite small. The resultant difficulty and expense thereof presents a very real objection, from the manufacturing point of view, to structures of this type.

The last patent referred to, 2,230,116, seeks to avoid this objection by one of three expedients. In Figs. 2 and 3 there is shown a body portion having a hardened inner camming surface or flared mouth. This is difficult if not impossible to produce on the inside of a brass member and hence is undesirable. In Fig. 4 there is shown an insert which may be of relatively hard material, i. e. material harder than that of the packing ring. This complicates the problem of manufacture as it requires the making of an additional member which must be carefully machined and then threaded into the body member proper. The form shown in Fig. 5 illustrates a lining of hard material located within the flared mouth of the relatively soft body member cc which also is difficult to construct in order to provide satisfactory operation.

My present invention seeks to avoid these various difficulties by a relatively simpler expedient, which is cheaper from the manufacturer's point of view, yet entirely satisfactory in operation and use and requires no additional members and no special hardening of any of the parts. More specifically I have discovered a comparatively simple mathematical relationship of the several parts, which, if followed, will result in overcoming the difficulties above referred to by taking into account the dimensions and hardnesses of the several parts and which then determines as a matter of design the limiting dimensions or relationships which may be used to attain the desired results without expensive additional parts, special hardenings or difficult and costly additional machining operations. The provision of a coupling having mathematical relationships or proportions in accordance with these teachings is a primary object of the present invention.

I have further discovered that in order to prevent the packing ring from biting into the camming surface, it is desired that the outer leading edge thereof be rounded, in accordance with a specific mathematical relationship taking into consideration the moduli of elasticity of the material of the packing ring and that of the flared mouth arranged to contact it. The provision of a packing ring constructed in accordance with this novel relationship is a further object to the present invention.

A more specific object of the present invention in this respect is to provide this curvature in such a manner that it will not unduly weaken the packing ring, particularly that portion thereof which is subject to the compressive forces incident to the camming operation required to complete a coupling. For this purpose I have provided a specific relationship by which the curved portion is restricted to the outer half of the thickness of the packing ring and bears a desired specific tangential relation to the outer surface thereof.

While the invention may be embodied in other forms of apparatus, I have illustrated in the drawing what I now consider to be a preferred type of coupling for carrying my invention into practice. Other forms or variations will occur to those skilled in the art after I have explained my invention herein.

Referring to the drawing:

Figure 1 is a longitudinal section of a coupling embodying my invention associated with a tube or pipe about to be coupled;

Fig. 2 is a fragmentary view of the parts in the coupled or sealed position;

Fig. 3 is an enlarged fragmentary view of the parts in an undesirable relation;

Fig. 4 is a similar view showing similar parts in a permissible relation;

Fig. 5 is a diagrammatic showing of the end of the cutting sleeve in reference to the rounding of the corner engageable with the flared mouth; and Figs. 6 and 7 show modified forms of the cutting sleeves or packing rings.

Referring to the drawing, it will be noted that the particular form of coupling illustrated comprises a body portion B externally threaded to receive a nut N and provided at its end with a cone-shaped or flared mouth M terminating in a shoulder 6. A tube T with which the coupling is to be employed is inserted in the body portion until its entering end abuts the shoulder 6. The nut N has a shoulder 8, shown sloping in the drawing, for the purpose of cooperating with a packing ring S so as to force the latter longitudinally towards the body portion B and to compress its rear end 7 against the tube T as the nut is tightened up. The sleeve or packing ring S is shown in the form of a hollow cylinder of generally uniform internal and external diameters prior to use. Preferably, although not necessarily, I so construct the packing ring S that either end thereof may be employed as the active end or zone, whereby assembly is facilitated. Each leading end of the packing ring S comprises an internal cutting edge, of which one is indicated at 4, and an external curved portion 3 for cooperation with the sloping wall of the flared mouth M of the body portion B. The intended operation is substantially as follows:

In assembling, the tube T is placed in the body portion B until, as stated above, its leading end abuts the shoulder 6 of the body portion. The sleeve S is placed in the position shown in Fig. 1, likewise the nut N, and the latter is tightened on the body portion B until the parts assume the relative position shown in Fig. 2 where it will be seen that the forward movement of the packing ring S, i. e. its movement toward the body member B, has caused the leading inner cutting edge 4 to cut, dig or plow into the outer surface of the tube T striking up an annular ridge 5 around the entire periphery of the tube T.

This coupling, if constructed according to my invention, provides a very effective and efficient fluid-tight seal between the tube T and the body member B and is comparatively inexpensive to manufacture and easy to assemble.

The component parts or elements of the coupling, as well as the tube T, will usually but not necessarily be made of metal.

To facilitate explanation of my invention and clarify the appended claim, I shall refer to that portion of the packing ring which lies to the left of the vertical broken line in Fig. 1 as the "active zone" or "active end" of the packing ring. By this I mean more or less of that part of the packing ring S which has entered the body member B and has been deformed or constricted by the flaring mouth M after the parts have been assembled and the nut N tightened. As indicated above, the opposite end of the packing ring may likewise be provided with a similar active zone to provide for its reversibility in use and so as to make the device substantially fool-proof in assembling.

In order satisfactorily to perform its cutting function the packing ring S is made of material which is harder than that of the tube T with which the coupling is to be employed. Preferably the packing ring S is of low carbon steel, surface hardened, when the tube to be coupled is of steel. The body member B and the nut N can be made of any suitable material, preferably metallic. The body member B need not necessarily be of a material harder than that of the packing ring S; it may be of the same hardness or softer.

The definite relationship (mentioned above) between certain physical characteristics that should not be exceeded and which, if obeyed, gives valuable and unobvious results, will now be explained.

Calling the Brinell hardness number of the surface of the flared mouth M in the body member B—"$H_B$", and the Brinell hardness number of the material of the active zone or end of the packing ring S—"$H_S$" (I have taken the Brinell hardness of that for a 10 millimeter ball at 3,000 kilograms) and where $a$ represents the angle of inclination of the flared or conical mouth M measured from the axis of the coupling as indicated in Fig. 1, and $t$ is the wall thickness in inches in the active zone or end of the packing ring S as indicated in Fig. 1, the relationship which I have discovered is expressed by the following equation:

$$\frac{\sqrt[3]{H_B}}{\sqrt[3]{H_S}} = \frac{t \times k}{\cos 2a}$$

For any particular values of Brinell hardness number ($H_B$) of the body member and ($H_S$) the packing sleeve, the value of the right hand term of the equation should not exceed that of the left hand term. $k$ is a constant which is substantially —31— insignificant digits being disregarded and the value 31 being sufficiently practical. If the particular packing ring S is one which has had its surface hardened, say to a depth of a few thousandths of an inch, leaving a soft core within the hardened packing ring, then the value of $H_S$ should be taken as one-half the measured surface Brinell hardness number.

I have found that if the above relationship is observed, i. e. the value of the right hand term of the equation is equal or smaller than that of the left hand term, the end of the packing ring S will not deleteriously affect the conical mouth or camming shoulder M when forced into it and it is not necessary to provide the active end of the packing ring S with special yielding means, or to harden the surface of the flaring mouth M deeper, or to a state harder than the packing ring.

When the forward end of the cutting ring forcibly contacts the surface of the flared mouth or funnel or camming shoulder M of the body of the coupling, there is more or less deformation of the contacting surfaces, depending upon the areas of contact, the angular relation of the parts, and the strength and hardness of the materials, among other things. I have found that couplings can be made and operated satisfactorily throughout many connections and disconnections of the parts, if the deformation of the flared mouth M of the body is not permitted to go to deleterious or injurious extent. Thus if the surface M is forcibly but smoothly wiped or ironed by contact with the adjacent end of the cutting sleeve while the latter is constricted into its cutting or biting engagement with the tube to be coupled, and is not so severely dented, cut or scuffed, as to prevent sealing contact, or so as to inhibit the multi-component movement of the end of the cutting sleeve in contact therewith, repeated satisfactory seals can be obtained. On the other hand, if the end of the packing ring contacting the flared mouth ruptures or deleteriously affects the surface as by turning up a chip so that it is substantially impossible for the sleeve to be advanced longitudinally, then the efficacy of the device may be permanently impaired; or if the end of the cutting ring contacting the flared mouth so deforms or depresses the surface of the mouth as to form a dent or groove, as shown in Fig. 3, by virtue of which the play of forces intended to constrict the end of the sleeve are so impaired as to defeat that primary function, then again the efficacy of the device may be impaired or substantially lost. In accordance with my invention, the deformation is insufficient to impair the efficacy of the device and I provide a packing ring which is satisfactorily operable notwithstanding that some deformation of the mouth M is present.

I have also found that for the purpose of my invention and within the range of utility thereof the diameter of the packing ring S and the length of the packing ring S beyond the active end thereof, or between the active ends, are comparatively unimportant factors.

When according to the teaching of my invention one has obtained a packing ring of hardness desired to cut and seal the kind of tube to be coupled and has provided a wall thickness for the packing ring within the teachings of my invention that permits satisfactory coaction with the flared mouth of a body made of the softest desired material, it will be apparent that the same packing ring may be employed with tubes of softer material and with bodies of harder materials.

While my teaching is concerned as above mentioned with the maximum value of the right hand term of the above equation, I am not unmindful that consideration must also be given to the strength of the packing ring S as influenced by its minimum wall thickness. For example, if it be found that a packing ring S of my invention should not have a wall thickness in excess of .030 inch, those skilled in the art would understand the obvious undesirability of making the wall thickness of the packing ring as small as .010 inch if by so doing the packing ring S were so weakened as to fail by buckling or otherwise under the familiar rules applicable to the strength of thin-walled tubular columns in longitudinal compression. I recognize that the well-known physical laws and formulae relating to such column loads, including as they do consideration for the length, diameter and wall thickness of the member as well as its material, must be taken into account by those practicing my invention and will present limits beyond which my invention should not be sought to be employed. I do not undertake to specify such limits in detail both because they will be readily recognized and because they can to quite a substantial extent be in effect moved back as by thickening and strengthening portions of the sleeve or the cutting ring for the sake of giving the increased column strength in portions beyond what I have called the active end thereof. For example, if a cutting sleeve made under the precepts of my invention were required to have no more than a maximum wall thickness of .030 inch for the purpose of my invention and were sought to be employed with a tube of two or three inches outside diameter and the sleeve were an inch or so long, it might well fail by buckling under column stresses if it were of uniform wall thickness throughout, but if the active end only, of such a hypothetical sleeve, were confined to the maximum prescribed thickness and the balance of the sleeve or the mid-portion thereof made substantially thicker, as shown in Figs. 6 and 7, then its column strength might well be preserved while also preserving the benefits of my invention.

As an example of an application of the above equation, assume that it is desired to determine the maximum wall thickness of the "active end" of the packing ring S in the form shown in Figs. 1 and 2, or such packings as are shown in Figs. 6 and 7, when it is desired to make the packing ring of low carbon free cutting steel cold drawn with a Brinell hardness number of 212, and to use free cutting hard leaded brass for the body B and with the flared mouth M thereof having a Brinell hardness of 131, and with the angle of inclination $a$ of the flared mouth at 12°; my equation will then give:

$$\frac{5.07}{5.96} = \frac{t \times 31}{\cos 24°}$$

so that $t$ will be found to be .025 inch maximum.

The relationship or equation above mentioned will be understood by those skilled in the art to refer to preferred values, reasonable departures therefrom lying within the scope of my invention and including ordinary plus or minus manufacturing tolerances, the more or less minor errors incident to reading the Brinell hardness numbers and the different values of friction that may be found on the surfaces of the flared mouth and the end of the sleeve contacting therewith due to the varying sharpness or dullness of tools and other manufacturing conditions.

I prefer to provide for rounding the outer forward edge or corner of the sleeve S, as illustrated in Fig. 5. In so doing I take into account the elastic limits of the material of the sleeves and bodies respectively, obtaining greater radii where the sleeve is relatively stronger than the body. I have found that good results may be obtained when the outside corner or edge of the ring or sleeve that first contacts the flared mouth of the body is rounded with a radius according to the following formula:

$$R = 0.010 \times \frac{E_S}{E_B}$$

in which R is the minimum radius in inches; $E_S$ is the modulus of elasticity of the material used in the packing ring or sleeve expressed in pounds per square inch, and $E_B$ is the modulus of elasticity of material employed in the body and especially the flared mouth or camming shoulder thereof.

As shown in Fig. 5 when the desired radius is small in respect to the thickness of the sleeve so that the rounding takes the shape of the arc 20, the arc may conveniently be struck from a center lying in a line at 45° to the inner and outer surfaces of the sleeve as at 21. The rounded corner 20 will bear smoothly on the flared mouth and fairly close to the front face 30 of the forward end of the sleeve S, as will be apparent upon inspection of Fig. 5, where the line M2 represents the flared mouth. If, however, the prescribed radius should be somewhat greater than the thickness of the sleeve S as I have illustrated by the arc 22 struck from a center point 23, the condition would be less desirable, in my present view, by virtue, of excessively thinning down the sleeve above and adjacent to the cutting edge 4. To accommodate such larger radii and to preserve a substantial square height above the cutting edge 4 as up to the point 31, for example, I prefer to move the center from which such radius is struck forwardly from the point 23 as to the point 24 so that the rounding of the edge will follow the arc 25, or substantial tangency, retaining, of course, its tangency to the outer surface of the sleeve. This permits the square front surface between the points 4 and 31 to be substantially half the thickness of the sleeve, as I prefer, and will permit the arc 25 to have its initial line of contact with the flared mouth of the body to be well forward on the curve as at about the point 26 so that the inwardly (downwardly as viewed in Fig. 5) acting forces will be reasonably adjacent to the front face 30 of the sleeve and the cutting edge 4.

In Figs. 6 and 7 I have illustrated two modified forms of cutting rings or sleeves S1 and S2. The active ends of these rings are constructed in accordance with the teaching of the instant specification. The thickened portion 40 of the sleeve S1 and the thickened portion 41 of the sleeve S2 are each disposed to give strength to the respective parts of the sleeves other than the active ends thereof.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combination and relations described, some of these may be altered and others omitted, and some of the features of each modification may be embodied in the others, without interfering with the more general results outlined, and the invention extends to such use within the scope of the appended claim.

What is claimed is:

Means for coupling a pipe of relatively hard material to a fitting of relatively soft material, wherein said fitting has a shoulder for engagement with the end of the pipe to be coupled thereto and a substantially frusto-conical, outwardly flared recess therein, comprising a ring of material harder than that of the pipe having a curved leading edge adapted slidingly to engage with the inner conical surface of said recess, and means cooperating with said ring and said fitting for forcing said ring into camming engagement with the conical surface of said recess, the angle of the conical surface of said recess in respect to the common axis of said pipe and said fitting and the thickness of said ring being jointly determined in accordance with the hardness of the surface of said recess and that of the surface-contacting portion of said ring so as to prevent undesired deformation of the surface of said recess upon the completion of the coupling such as will prevent effective re-use of the coupling.

PAUL D. WURZBURGER.